US008836491B2

(12) United States Patent
Rao et al.

(10) Patent No.: US 8,836,491 B2
(45) Date of Patent: Sep. 16, 2014

(54) OCCUPANT DETECTION

(75) Inventors: Manoharprasad K. Rao, Novi, MI (US); Mark A. Cuddihy, New Boston, MI (US); Tai Luu, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 511 days.

(21) Appl. No.: 12/770,238

(22) Filed: Apr. 29, 2010

(65) Prior Publication Data

US 2011/0267186 A1 Nov. 3, 2011

(51) Int. Cl.
*B60R 25/10* (2013.01)

(52) U.S. Cl.
USPC ............ 340/426.24; 340/426.26; 340/426.13; 701/45

(58) Field of Classification Search
USPC ........... 340/425.5, 438, 439, 499, 522, 573.1, 340/584, 588, 665, 666, 667, 426, 1, 24, 26, 340/556, 426.1, 426.13, 426.24, 426.26; 701/44, 45; 382/100, 104, 156; 296/76; 180/268, 282, 287; 250/221, 342, 250/DIG. 1; 280/735; 348/148
See application file for complete search history.

(56) References Cited

U.S. PATENT DOCUMENTS

| | | | | |
|---|---|---|---|---|
| 5,071,160 A | * | 12/1991 | White et al. | 280/735 |
| 5,482,314 A | * | 1/1996 | Corrado et al. | 280/735 |
| 5,585,625 A | * | 12/1996 | Spies | 250/221 |
| 6,026,340 A | * | 2/2000 | Corrado et al. | 701/47 |
| 6,166,625 A | * | 12/2000 | Teowee et al. | 340/426.26 |
| 6,515,582 B1 | * | 2/2003 | Teowee et al. | 340/426.1 |
| 6,517,107 B2 | * | 2/2003 | Johnson et al. | 280/735 |
| 6,714,132 B2 | | 3/2004 | Edwards et al. | |
| 6,724,920 B1 | * | 4/2004 | Berenz et al. | 382/118 |
| 6,762,676 B2 | * | 7/2004 | Teowee et al. | 340/426.1 |
| 6,768,420 B2 | * | 7/2004 | McCarthy et al. | 340/573.1 |
| 6,810,135 B1 | * | 10/2004 | Berenz et al. | 382/118 |
| 6,904,347 B1 | * | 6/2005 | Berenz et al. | 701/45 |
| 6,922,147 B1 | * | 7/2005 | Viksnins et al. | 340/573.1 |
| 6,940,400 B2 | | 9/2005 | Pelletier | |
| 7,110,570 B1 | * | 9/2006 | Berenz et al. | 382/104 |
| 7,164,117 B2 | | 1/2007 | Breed et al. | |
| 7,242,282 B2 | * | 7/2007 | Pinckney, Sr. | 340/426.28 |
| 7,348,880 B2 | * | 3/2008 | Hules et al. | 340/522 |
| 7,415,126 B2 | | 8/2008 | Breed et al. | |
| 2004/0155783 A1 | * | 8/2004 | Al-Sheikh | 340/584 |

(Continued)

FOREIGN PATENT DOCUMENTS

JP 2000185609 A 7/2000
JP 2006159939 A 6/2006

OTHER PUBLICATIONS

Texas Transportation Institute, Automated Vehicle Occupancy Technologies Study: Synthesis Report, Report No. FHWA-HOP-07-134, Aug. 2007, 45 pages.

*Primary Examiner* — Van T. Trieu
(74) *Attorney, Agent, or Firm* — Brooks Kushman P.C.; Frank A. Mackenzie

(57) ABSTRACT

A system and method for detecting an occupant in a vehicle capture successive images from an infrared camera that are analyzed to detect thermal characteristics of an occupant as well as movement. If an operator of the vehicle has exited the vehicle, the vehicle is deactivated, an occupant is detected, and a temperature in the cabin of the vehicle is higher or lower than desired, a report is made to the operator via a mobile phone or key fob.

18 Claims, 6 Drawing Sheets

(56) References Cited

U.S. PATENT DOCUMENTS

| | | | |
|---|---|---|---|
| 2005/0077469 A1* | 4/2005 | Kaushal | 250/330 |
| 2005/0157772 A1* | 7/2005 | Fischer et al. | 374/131 |
| 2008/0051957 A1 | 2/2008 | Breed et al. | |
| 2008/0125941 A1 | 5/2008 | Mitteer | |
| 2008/0142713 A1 | 6/2008 | Breed et al. | |
| 2009/0066065 A1 | 3/2009 | Breed et al. | |
| 2011/0295466 A1* | 12/2011 | Ostu et al. | 701/45 |
| 2013/0314536 A1* | 11/2013 | Frank et al. | 348/148 |

* cited by examiner

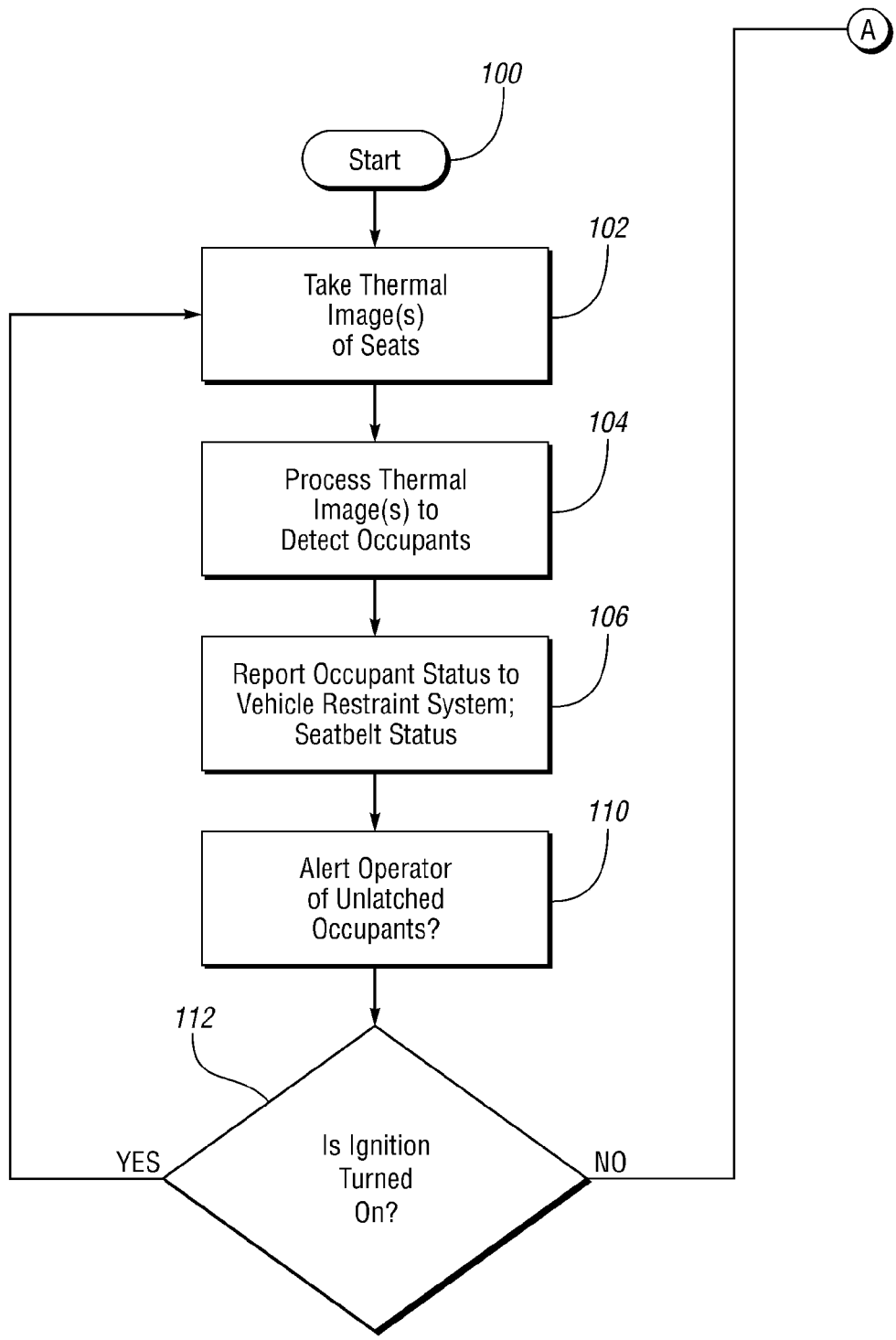

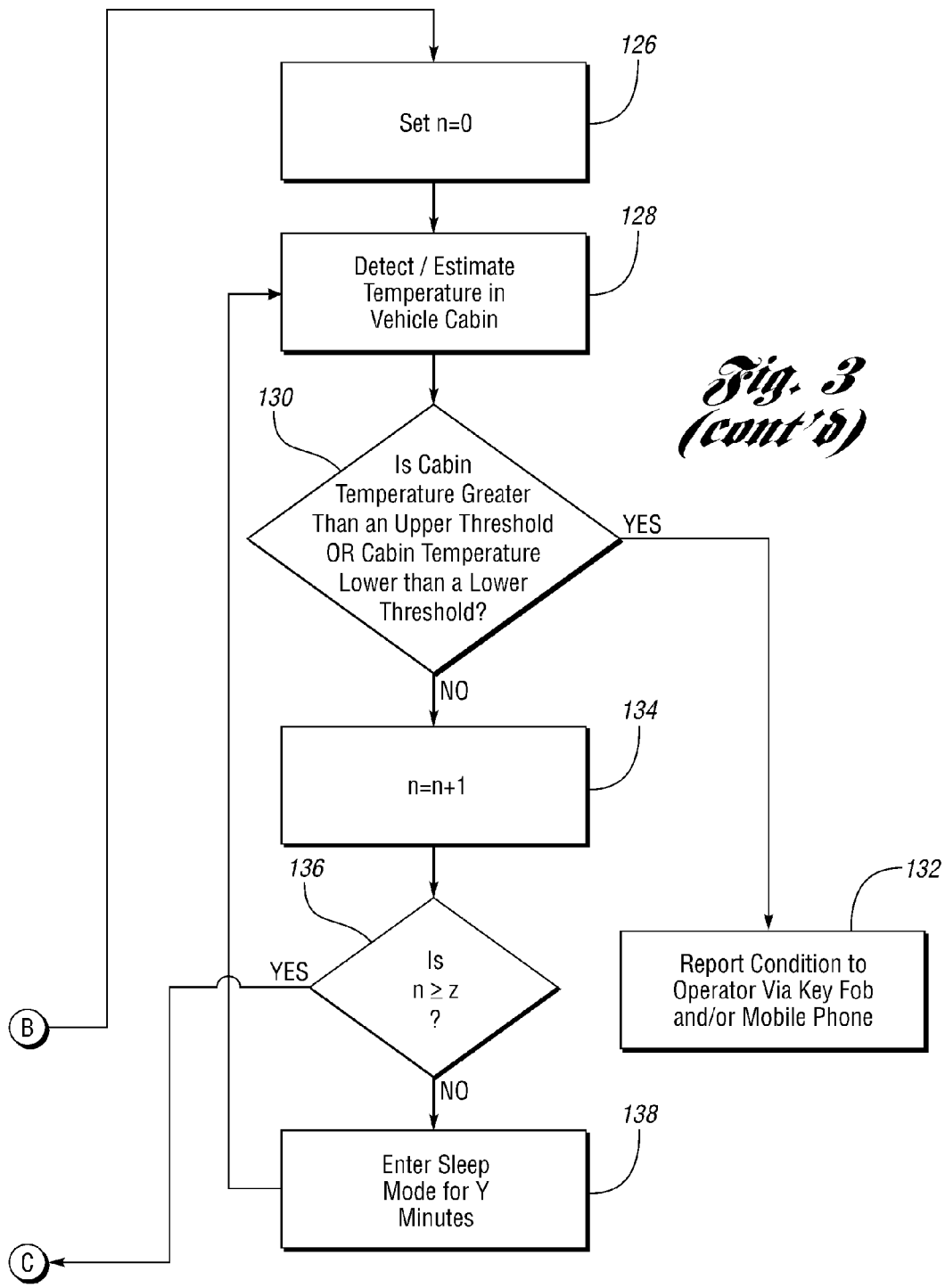

OCCUPANT DETECTION

BACKGROUND

1. Technical Field

The disclosure relates generally to occupant detection and responding to such detection, such as providing: an alert as to the presence of an occupant and providing a response based on the nature of the occupant.

2. Background Art

Detection of the presence and nature of occupants within a vehicle is desired for many purposes, including ensuring that all occupants are restrained by a latched seat belt, providing an appropriate output from a passive restraint system based on the apparent size/weight of the occupant, and providing a signal to a former occupant of the vehicle that an occupant has been left behind in the vehicle, possibly a heated vehicle.

Thermal imagining has been proposed to detect occupants of the vehicle. However, detection of occupants is confounded when the occupant is partially, or totally, concealed by a blanket, a hat, sunglasses, etc.

SUMMARY

To address at least one issue, presence of an occupant in a vehicle is detected by capturing a thermal image of a vehicle seat, processing the image for indicia of occupants, including thermal profile and movement, and reporting to an electronic device when an occupant is detected based on at least thermal profile and movement. The electronic device is a mobile phone and/or a key fob. In one embodiment, whether the operator of the vehicle has exited the vehicle is determined and the reporting to the electronic device is further based on such detection. In yet another embodiment, the reporting to the electronic device is further based on temperature inside the vehicle exceeding a threshold temperature. In some embodiments, the capturing and processing of the thermal image is conducted at fixed intervals with the camera and the processor suspended in between the fixed intervals to save energy.

In one embodiment, it is determined whether the vehicle is activated and whether a seatbelt associated with the seat has a latched occupant. If the seat has an occupant, the seatbelt is unlatched, and the vehicle is activated, an operator alert is activated. The operator alert includes a warning lamp and/or an audible warning signal. Whether the vehicle is activated can be based on key-on, an engine or electric motor (for propulsion) rotating, ignition activated, as examples.

One advantage of some embodiments is that it is easier to discern living objects, which yields simpler algorithms. Also, lower image resolution is required with embodiments described herein, which reduces microprocessor cost and computational intensity. Additionally, one occupant presence detection system can be used to detect interior temperature for child left behind function and also for general occupant sensing.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated and described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations consistent with the present disclosure, e.g., ones in which components are arranged in a slightly different order than shown in the embodiments in the Figures. Those of ordinary skill in the art will recognize that the teachings of the present disclosure may be applied to other applications or implementations.

Figure 1:
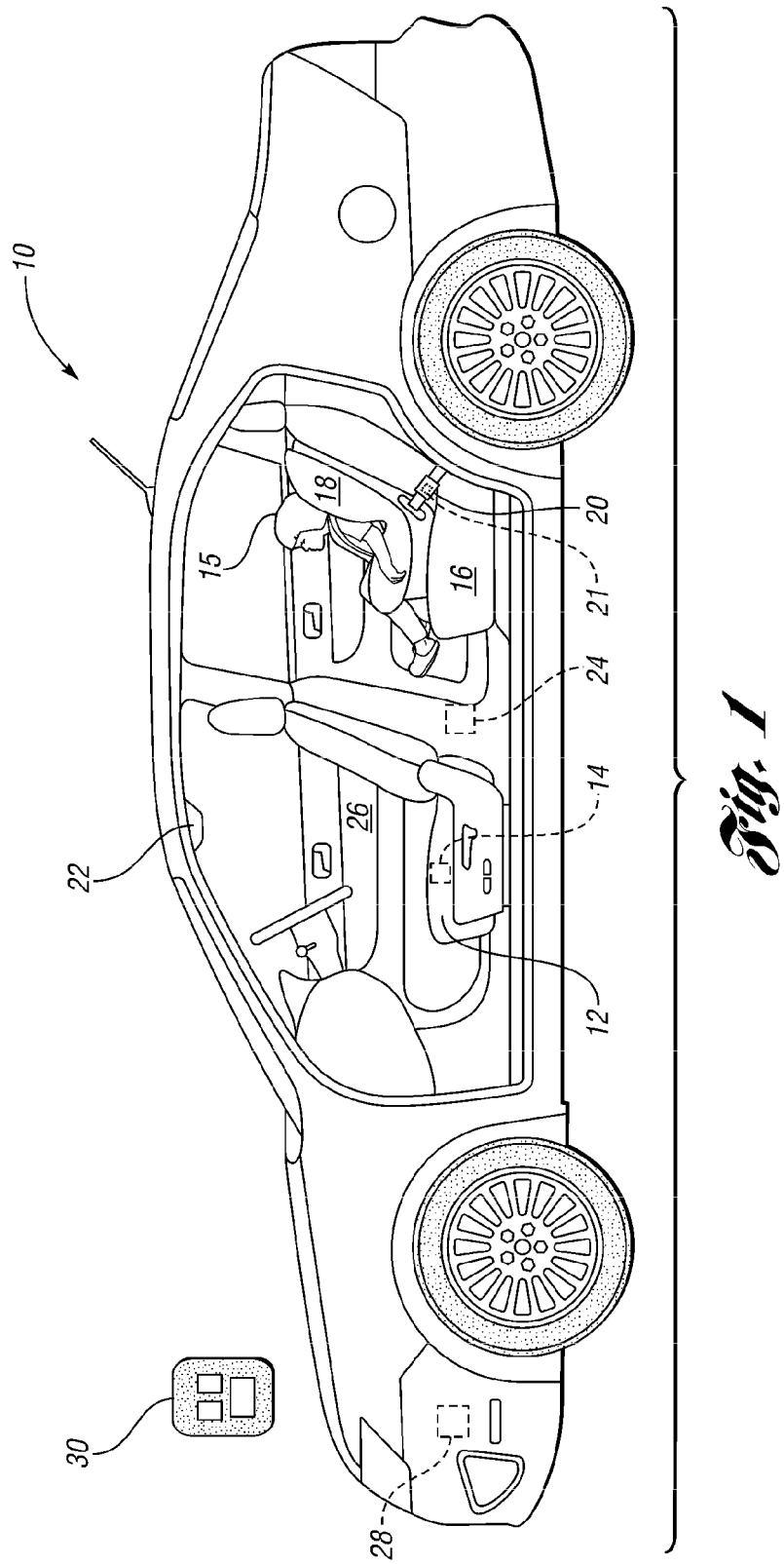
FIG. 1 shows a vehicle having a roof-mounted camera.

A vehicle 10 is shown in FIG. 1. One seat 12 is visible in the front of vehicle 10. In some embodiments, a weight sensor 14 is provided on vehicle 10 to detect the weight of an occupant in seat 12. From the view in FIG. 1, only one seat 16 is visible in the back of vehicle 10. In some embodiments, seat 16 is a bench seat provided with seat belts for two or three passengers. In other embodiments, seat 16 is an individual seat with another individual seat (not visible in FIG. 1) provided alongside seat 16. A child seat 18 is placed into seat 16 being tethered by a rear seat belt/buckle 20. Alternatively, or additionally, child seat 18 is tethered to seat 16 by a set of straps (not shown) provided at the back of child seat 18, which couple to anchors (not shown) on seat 16. Seat 16 has a human occupant 15. In addition to human occupants being sensed, in some embodiments, other living beings, such as dogs, may be detected. In such a case, the pet owner may appreciate being alerted to a situation in which the pet is being exposed to unsafe conditions.

An infrared camera 22 is mounted from a roof of vehicle 10. In other embodiments, multiple infrared cameras are provided in the vehicle. In yet other embodiments, infrared camera 18 is mounted at a different location in vehicle 10. In the embodiment shown in FIG. 1, infrared camera 18 is centrally located to obtain a view of rear seats between headrests of front seats.

Also shown in FIG. 1 is a door sensor 24, which indicates whether a vehicle door 26 is open. In FIG. 1, door 26 and sensor 24 are provided on the passenger side. All doors of vehicle 10 can be provided with sensors 24 to detect the status of the doors.

Also coupled to an exterior of vehicle 10 is a transmitter/receiver/locator 28. Transmitter/receiver/locator 28 can provide a signal to and receive a signal from a key fob 30 associated with the vehicle. A signal from key fob 30 can lock/unlock car doors. A signal to key fob 30 can indicate that there is a vehicle occupant who has been left behind. Transmitter/receiver/locator 28 communicates with key fob 30 to determine where key fob 30 is located. Furthermore, starting by pushbutton control is allowed when key fob 30 is within vehicle 10. The transmitter, receiver, and locator functions are shown in a single package, element 28, in FIG. 1. Alternatively, the functions can be separated in multiple units. In yet other embodiments, multiple transmitter/receiver/locator 28 units are provided at multiple locations on vehicle 10 to provide the desired functionality, e.g., the ability to triangulate to accurately determine the location of the key fob. Herein, the term key fob is used. However, this refers to a remote control device associated with a vehicle, regardless of whether the device has a key or not.

Figure 2:
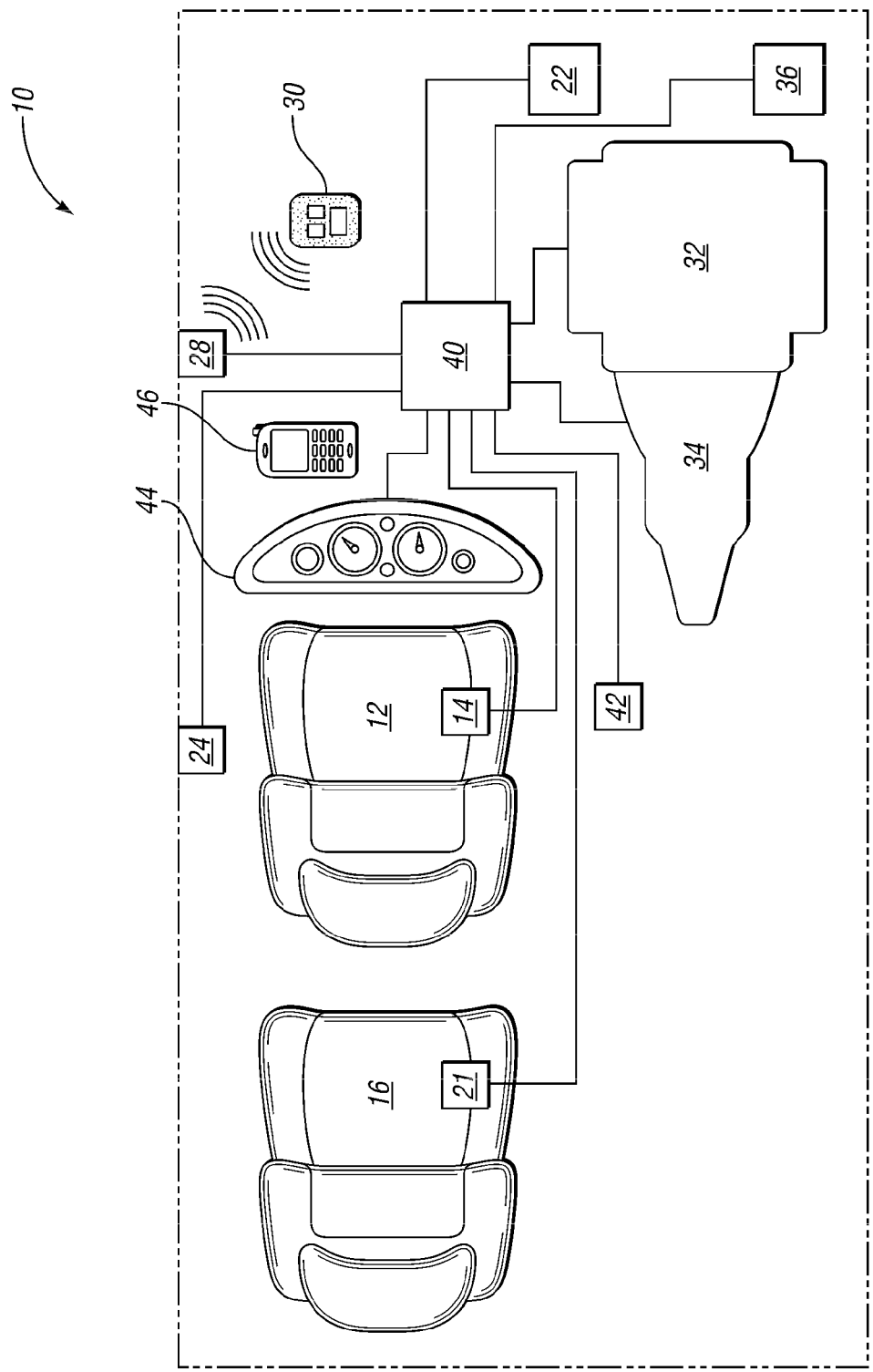
FIG. 2 is a schematic of a vehicle according to an embodiment of the disclosure.

Vehicle 10 is shown in schematic form in FIG. 2. Vehicle 10 includes an engine 32 and transmission 34. An operator of the vehicle communicates a desire to start or stop operation via ignition switch 36. An electronic control unit (ECU) 40 is electronically coupled to engine 32, transmission 34, and ignition switch 36. ECU 40 is provided signals from seat belt buckle sensor(s) 21, from weight sensor(s) 14, door sensor(s) 24, infrared camera 22 and transmitter/receiver/locator(s) 28. Two-way communication between ECU 40 and transmitter/receiver/locator(s) 28 is provided. In some embodiments, a cabin temperature sensor 42 is provided in the cabin with a signal from sensor 42 communicated to ECU 40. In one embodiment, cabin temperature sensor 42 is supplanted by camera 22. In FIG. 2, key fob 30 is located onboard vehicle 10. Key fob 38 communicates wirelessly with transmitter/receiver/locator 28. Two-way communication between ECU 40 and a driver display 44 allows display of information such as vehicle speed, engine speed, engine faults, and fuel level and operator input such as resetting a trip odometer. In particular, driver display 44 may be provided with an occupant status alert indicating occupant presence and the seatbelt status for seats having occupants. This may be a graphical, text, or audio alert. The operator of vehicle 10 may be carrying a mobile phone 46 onboard vehicle 10. According to an embodiment of the disclosure, ECU 40 may alert the operator via mobile phone 46, after the operator has left vehicle 10, in the event that an occupant is left behind and cabin temperature exceeds a threshold temperature. This alert may be an alarm that simply causes the mobile phone to beep or vibrate, a phone call with a prerecorded message indicating the issue, a text message, or any other suitable alert to get the driver's attention. Communication distance between the key fob 30 and vehicle 10 is limited. However, such distance is being increased to provide additional functionality on key fob 30. Mobile phones, in contrast, have no such limitation. However, both the mobile phone 46 and vehicle 10 must be in a location with network coverage to allow communication. Furthermore, vehicle 10 must be provided with a service to communicate to the mobile phone network. Additionally, ECU 40 is unable to report to a mobile phone, the number of which is not previously provided to ECU 40.

Figure 3:
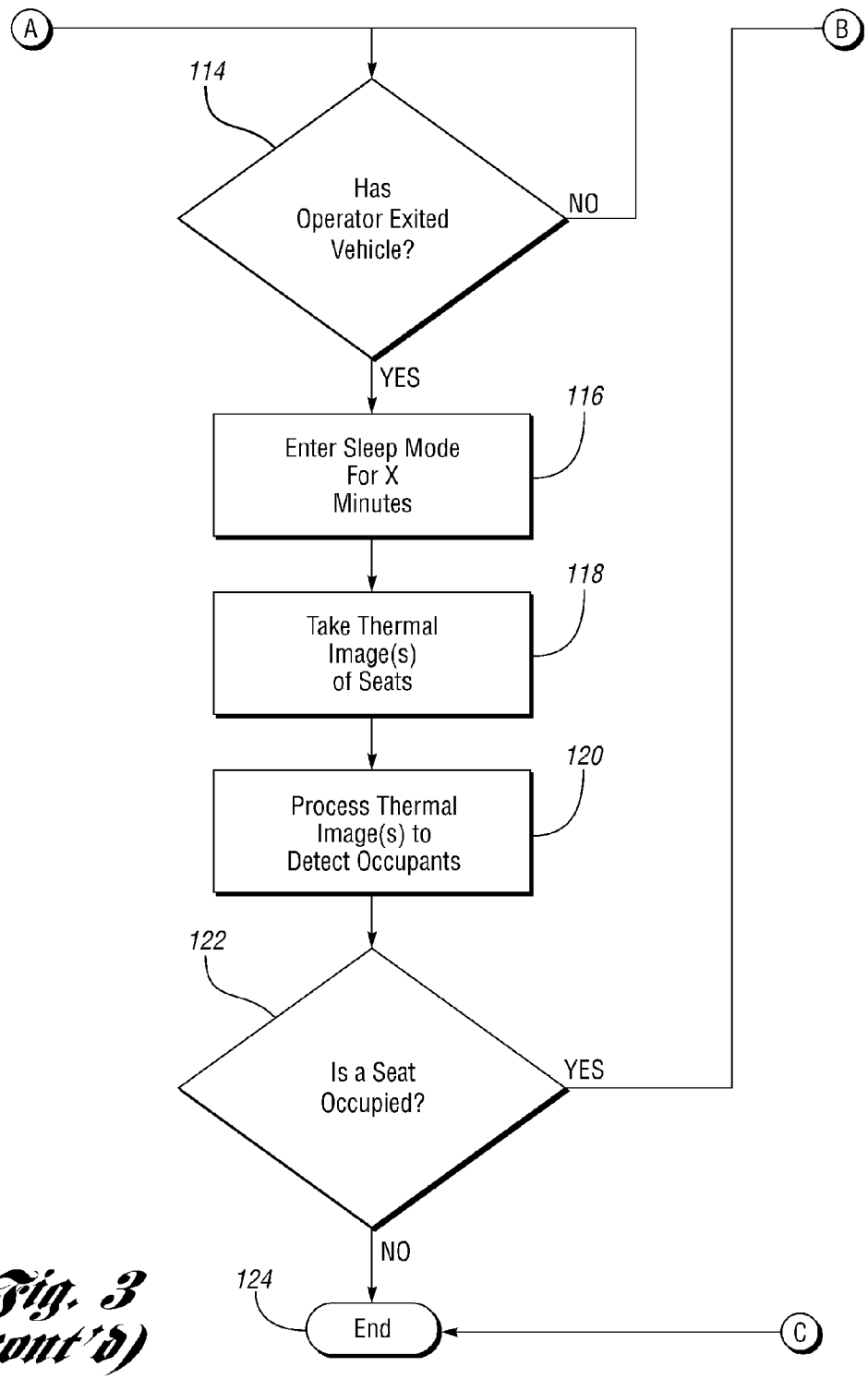
FIGS. 3 and 4 are flowcharts illustrating algorithms according to embodiments of the disclosure.

A flowchart indicating an embodiment of the disclosure begins in block 100 in FIG. 3. Control passes to block 102 in which the infrared camera is commanded to take an image of the seat or seats. A single camera may cover multiple rows, or there may be multiple cameras, one for each seat or one for each row of seats, in which case, each camera is commanded to take an image of the seat. In some embodiments, multiple images are taken in a burst, e.g., 10 images in a second. Control passes to block 104 in which the image(s) are processed to detect occupants and/or occupant status. Image processing is discussed in more detail in regards to FIG. 4. Control passes to block 106 in which the occupant status is reported to the vehicle restraint system. In some embodiments, the latched/unlatched status of seatbelts is also communicated to the vehicle restraint system in block 106. Status of the occupants can include whether the seatbelt of the seat in which they are sitting is latched and an apparent size or weight of the occupant. The deployment strength of the passive restraint system, i.e., air bags, can be set based on the estimated size/weight of the occupant. In block 110 an alert to a vehicle operator concerning unlatched occupants is provided, either aurally or visually. Control passes to block 112 in which it is determined whether the ignition is on. If yes, control passes back to block 102. A previously belted person could become unbelted during operation of the vehicle. A negative result in 112 passes control to 114, in which it is determined whether the operator of the vehicle has exited the vehicle. This can be based on the weight sensor in the seat, thermal imaging in relation to the driver's seat, whether the driver's door has been opened and then subsequently closed, or whether the key fob is inside or outside the vehicle. A combination of the methods can be used to provide greater certainty.

Control passes to block 116 in which a sleep mode is entered for a predetermined period of time, X. Recall that the ignition is off when block 116 is entered. To avoid draining the battery, the succeeding operations are performed periodically. Implicit in the flowchart is that the camera is turned off when not being used for taking thermal images and commanded to turn on when the predetermined period has elapsed. Control passes to block 118 in which a thermal image, or a series of images, is captured of the rear seating locations. Alternatively, the passenger seat in the front can also be collected. For example, a disabled or elderly passenger may choose to be left in the car while the driver runs errands. As the passenger may be of limited mobility, it may be useful in some embodiments to provide alerts in regards to the front passenger seat as well. Control passes to block 120 in which the thermal images are processed to detect one or more occupants. In decision block 122, the algorithm ends in 124 when no occupants and control passes to 126 if one or more occupants are detected. A counter, n, is set to zero in 126. Control passes to block 128 in which ambient temperature of the vehicle cabin is detected. This can be determined through a temperature sensor in the cabin. Alternatively, the temperature can be inferred from the thermal image of the seating surface that is not occluded by the passenger. Control passes to block 130 in which the measured or inferred cabin temperature is compared to a threshold temperature. When the temperature is higher than the threshold temperature, control is passed to block 132 in which the condition is reported to the "recent" operator of the vehicle via the key fob or mobile phone. For a negative result in block 130, control passes to block 134 in which the counter is incremented. Control passes to decision block 136 in which it is determined if the counter has exceeded a maximum number of cycles, z. That is, the checking routine is performed a maximum of z times. If cabin temperature doesn't exceed the threshold after z times, then it is assumed that the temperature is not likely to rise to the threshold and/or the routine is suspended to ensure that the battery is not drained. For a positive result in block 136, the routine ends in block 124. For a negative result in block 136, control passes to block 138 in which the routine is suspended for a predetermined time, Y. After the delay time has passed, control passes to block 128 to determine cabin temperature.

In an analogous embodiment, a lower limit threshold temperature is compared to the cabin temperature to prevent hypothermia. A report to the operator is commanded when the cabin temperature is lower than the lower limit threshold temperature.

Figure 4:
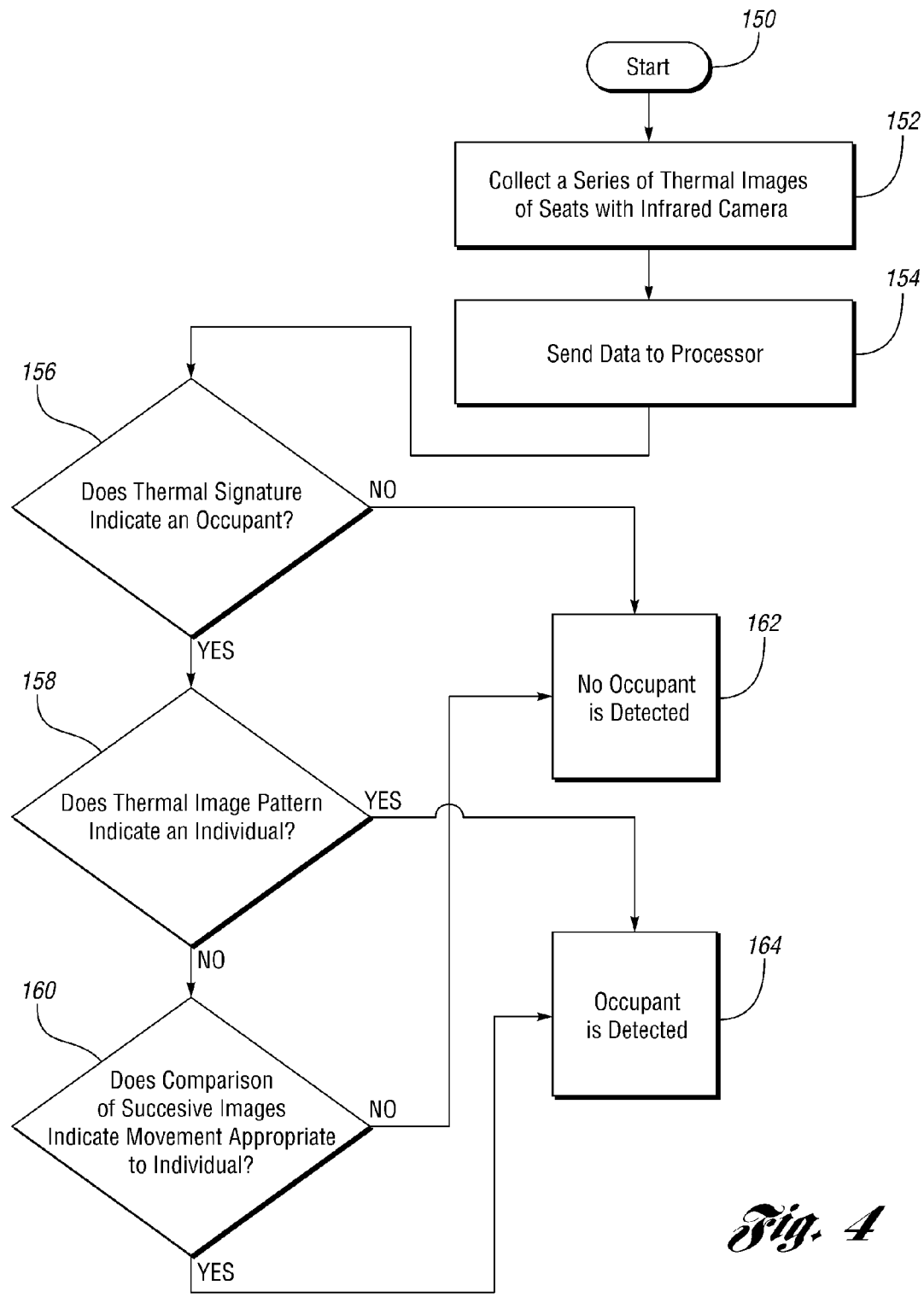

Greater detail of the occupant detection is shown in the flowchart in FIG. 4, which illustrates an embodiment of the disclosure. The algorithm starts in block 150 and continues to 152 in which a series of thermal images associated with the seats are captured. As discussed above, a single camera may be used to collect images for multiple seats or multiple cameras may be provided. The image series refer to images captured at successive times. The processes involved in determining whether a seat is occupied are performed for multiple seating locations of interest. In some embodiments, the driver's and/or passenger's front seat are not analyzed. In other embodiments, all seats are analyzed. In block 154, the thermal image data in the camera is provided to a processor. The processor can reside in the camera, ECU 40, or a separate processor. In block 156, the processor determines whether the thermal signature indicates presence of an occupant. All objects emit radiation, with the wavelength distribution being dependent on the temperature of the object. Also, the overall intensity of the radiation generally increases as temperature increases. Under most conditions, radiation in the temperature range expected for a living object can be separated from background radiation. However, in some cases, the seat may attain a temperature that may confound the determination of whether the seat is occupied. For a negative result in block 156, the seat in question is determined to be unoccupied. For a positive result in block 156, control passes to decision block 158 in which pattern recognition is applied to determine whether the thermal image is indicative of an individual. For example, it is common to locate two eyes by analyzing the pattern of the thermal image. The distance between the eyes is expected to be within a narrow range. If the features identified as eyes fall into this narrow range, then it is determined to be an occupant. That is, a positive result in block 158 passes control to block 164. In some situations, the eyes are not detectable by pattern recognition due to being occluded by sunglasses or a newspaper or due to the face being bent or turned at an angle. However, it is still possible that the object at the appropriate temperature is an occupant regardless of a negative result in block 158. Thus, a negative result in block 158 passes to decision block 160, in which successive images, in the location of one of the seats, are analyzed to determine normal human movement. Even a sleeping individual moves slightly due to respiration. This can be detected by analyzing images taken in fairly quick succession. For a positive result in block 160, an occupant is deemed to have been detected, block 164. If there is no discernible movement, no occupant is detected, block 162.

As mentioned above, the detection system can be used to detect pets, in particular dogs. The features specific to dogs, e.g., temperature profile, image features such as eyes or nose can be used to determine the presence of a pet.

While the best mode has been described in detail, those familiar with the art will recognize various alternative designs and embodiments within the scope of the following claims. Where one or more embodiments have been described as providing advantages or being preferred over other embodiments and/or over background art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. For example, it may be desirable to have an extensive set of cameras and/or transmitter/receiver/locators to provide an accurate determination of seat occupancy, location of the key fob, and communications to/from the key fob. The optimal number of such devices with respect to accuracy is likely to clash with the optimal number with respect to cost. A suitable compromise, depending on the application, may be selected. The embodiments described as being less desirable relative to other embodiments with respect to one or more characteristics are not outside the scope of the disclosure as claimed.

What is claimed:

1. A method to detect the presence of an occupant in a vehicle seat, comprising:
   capturing a thermal image of the seat;
   processing the image for indicia of occupants wherein the indicia include thermal profile and movement;
   reporting to an electronic device when an occupant is detected based on at least thermal profile and movement; and
   generating an alert in response to the report indicating the presence of an occupant.

2. The method of claim 1 wherein the electronic device is a vehicle restraint system, wherein generating an alert comprises activating at least one of a warning lamp and an audible warning signal, and wherein the generating an alert is further in response to three conditions being satisfied: the seat has an occupant, a seatbelt is unlatched, and the vehicle is activated; the method further comprising:
   detecting whether the vehicle is activated, wherein activated includes at least one of: a vehicle ignition being activated, a vehicle engine rotating, and a vehicle transmission being in a forward or reverse gear; and
   determining whether a seatbelt associated with the seat having an occupant is latched.

3. The method of claim 1 wherein the reporting to the electronic device is further based on one of a temperature inside the vehicle exceeding an upper threshold temperature and the temperature inside the vehicle being less than a lower threshold temperature.

4. The method of claim 1 wherein the reporting to the electronic device is further based on repeating the capturing a thermal image and processing the thermal image; and determining that at least one occupant is in the vehicle.

5. The method of claim 4 wherein the repeating of the capturing the thermal image and processing the thermal image is conducted at fixed intervals, further comprising:
   deactivating a device used to capture the thermal image and suspending thermal image processing in between the fixed intervals.

6. The method of claim 1 wherein the reporting to the electronic device is further based on a detection of an operator exiting the vehicle, the detection of the operator exiting the vehicle is based on at least one of sensing an occupant on a driver's seat and a driver's door being opened and subsequently closed.

7. The method of claim 1, further comprising:
   estimating a size classification of an occupant based on the thermal image; and
   basing a deployment intensity of a passive restraint system associated with the seat on at least one of the estimated size classification.

8. The method of claim 1, wherein the electronic device is a cellular phone, and wherein the alert is at least one of a vibrating alarm, an audible alarm, and a text message.

9. The method of claim 1, wherein the electronic device is a key fob, and wherein the alert is at least one of an audible alarm generated by the key fob, an illuminated alarm, and a vibrating alarm.

10. A method to detect the presence of an occupant in a vehicle, comprising:
   capturing a series of thermal images of a vehicle seat;
   processing the images for indicia of occupants wherein the indicia include at least thermal profile and movement; and
   sending an alert to a remote electronic device when an occupant is detected based on the indicia, a driver has exited the vehicle, and the vehicle is in a key-off mode, wherein the remote device is a key fob and the alert is at least one of: an audible alarm generated by the key fob, an illuminated alarm, and a vibrating alarm, and wherein the determination that the driver has exited the vehicle is based on at least one of: a detected location of the key fob outside the vehicle, and driver's door being opened and subsequently closed.

11. The method of claim 10 wherein:
the series of thermal images are captured during a burst interval;
the thermal images are captured by an infrared camera coupled to the vehicle; and
the images are provided to an electronic processor, the method further comprising:
suspending operation of the infrared camera upon completion of the burst interval.

12. The method of claim 10 wherein the processing of the images comprises:
image processing at least one of the thermal images to detect an object in the image based on a region of the image being at a temperature indicative of a living being.

13. The method of claim 12 wherein the processing of the image further comprises:
identifying a feature associated with the living being;
determining a position of the feature in multiple images; and
determining movement of the living being based on a displacement of the position of the feature among images.

14. The method of claim 12 wherein the living being is one of a human being and an animal.

15. An occupant presence detection system for a vehicle, comprising:
an infrared camera coupled to the vehicle;
a processor coupled to the infrared camera wherein the camera is commanded to capture a series of consecutive images, the images are uploaded to the processor, the images are analyzed in the processor, and the presence of an occupant is based on both image processing indicating a potential occupant and movement of a feature of the potential occupant; and
a transmitter coupled to the vehicle and electronically coupled to the processor wherein the processor commands the transmitter to send an alert to a key fob associated with the vehicle when the processor has detected an occupant in the vehicle and the key fob is determined to be outside the vehicle.

16. The occupant presence detection system of claim 15 wherein the infrared camera is aimed at a specific seat of the vehicle.

17. The occupant presence detection system of claim 15, further comprising:
a key fob locator coupled to the vehicle and electronically coupled to the processor, the key fob locator indicating whether the key fob is outside the vehicle, wherein the sending of an alert to the key fob is further based on the key fob being outside the vehicle.

18. The occupant presence detection system of claim 15 wherein the infrared camera is aimed at multiple seats within the vehicle and the processor performs occupant presence detection for each of the multiple seats.

* * * * *